US005715454A

United States Patent [19]
Smith

[11] Patent Number: 5,715,454
[45] Date of Patent: Feb. 3, 1998

[54] VERSION CONTROL OF DOCUMENTS BY INDEPENDENT LINE CHANGE PACKAGING

[75] Inventor: Richard Brittain Smith, Poway, Calif.

[73] Assignee: Hewlett-Packard Company, Palo Alto, Calif.

[21] Appl. No.: 610,784

[22] Filed: Mar. 11, 1996

[51] Int. Cl.$^6$ .................................................. G06F 17/30
[52] U.S. Cl. ........................ 395/619; 395/610; 395/616
[58] Field of Search ...................................... 395/610–622

[56] References Cited

U.S. PATENT DOCUMENTS

| | | | |
|---|---|---|---|
| 4,558,413 | 12/1985 | Schmidt et al. | 395/619 |
| 5,278,979 | 1/1994 | Foster et al. | 395/619 |
| 5,280,612 | 1/1994 | Lorie et al. | 395/608 |
| 5,319,774 | 6/1994 | Ainsworth et al. | 395/182.18 |
| 5,321,610 | 6/1994 | Breslin | 395/209 |
| 5,408,470 | 4/1995 | Rothrock et al. | 370/261 |
| 5,499,357 | 3/1996 | Sonty et al. | 395/500 |
| 5,592,661 | 1/1997 | Eisenberg et al. | 395/615 |
| 5,600,832 | 2/1997 | Eisenberg et al. | 395/619 |

OTHER PUBLICATIONS

Aide–de–Camp Administrator's Guide, Version 9.0, Software Maintenance & Development Systems, Inc. (SMDS), Rev. h, May 1994, Chapters 1–16.

*Primary Examiner*—Wayne Amsbury

[57] ABSTRACT

A database version control method assures consistency of computer information that is resident in first and second data repositories. Each data repository is adapted to transfer changes in the computer information to the other data repository and further includes a version control procedure. The version control procedure implements the steps of: producing an independent change package data file (ICPF) in the first repository which indicates a change relating to a line of the computer information, the ICPF including a change order value which is temporally related. The ICPF is transferred to the second repository and is arranged in the computer information in the second repository in a change order value manner with respect to all other ICPF's evidencing changes to the same line of the code. The arranging of the newly inserted ICPF takes into account a creation time notation that is included in the change order value. The version control procedure further employs an absolute address accompanying each section of change data in an ICPF which lists the absolute addresses of all intermediate lines of code that are relevant to the latest ICPF. Even if the receiving repository does not include data for each listed address, the receiving repository employs the missing absolute address as a place holder—to await later possible insertion of the actual data.

9 Claims, 3 Drawing Sheets

```
{CREATE 1}   ORIGINAL FIRST LINE
{CREATE 2}   ORIGINAL SECOND LINE
{CREATE 3}   ORIGINAL THIRD LINE

MAY 3, 1995 : BOISE

{CREATE 1}   ORIGINAL FIRST LINE
   {B FIRST 1} FIRST ADDED LINE AFTER ORIGINAL FIRST
              LINE; {5/3/95; 1300}

MAY 10 1995 : VANCOUVER

{CREATE 1}   ORIGINAL FIRST LINE
   {VC FIRST 1} FIRST ADDED LINE AFTER ORIGINAL FIRST
                LINE; {5/10/95; 1400}

MAY 10, 1995: TRANSFER OF CODE CHANGES BETWEEN VANCOUVER
AND BOISE.

-VANCOUVER LISTING:
   {CREATE 1}   ORIGINAL FIRST LINE
      {VC FIRST 1} FIRST ADDED LINE AFTER ORIGINAL FIRST
                   LINE; {5/10/95; 1400}
      {B FIRST 1} FIRST ADDED LINE AFTER ORIGINAL FIRST
                  LINE; {5/3/95; 1300}
-BOISE LISTING:
   {CREATE 1}   ORIGINAL FIRST LINE
      {VC FIRST 1} FIRST ADDED LINE AFTER ORIGINAL FIRST
                   LINE; {5/10/95; 1400}
      {B FIRST 1} FIRST ADDED LINE AFTER ORIGINAL FIRST
                  LINE; {5/3/95; 1300}
```

{SECOND 1} {FIRST 1} {CREATE 1}

{CREATE 1}   ORIGINAL FIRST LINE
{CREATE 2}   ORIGINAL SECOND LINE
{CREATE 3}   ORIGINAL THIRD LINE

MAY 3, 1995 : BOISE

{CREATE 1}   ORIGINAL FIRST LINE
  {B FIRST 1} FIRST ADDED LINE AFTER ORIGINAL FIRST
              LINE; {5/3/95; 1300}

MAY 10 1995 : VANCOUVER

{CREATE 1}   ORIGINAL FIRST LINE
  {VC FIRST 1} FIRST ADDED LINE AFTER ORIGINAL FIRST
               LINE; {5/10/95; 1400}

MAY 10, 1995: TRANSFER OF CODE CHANGES BETWEEN VANCOUVER AND BOISE.

—VANCOUVER LISTING:

{CREATE 1}   ORIGINAL FIRST LINE
  {VC FIRST 1} FIRST ADDED LINE AFTER ORIGINAL FIRST
               LINE; {5/10/95; 1400}
  {B FIRST 1}  FIRST ADDED LINE AFTER ORIGINAL FIRST
               LINE; {5/3/95; 1300}

—BOISE LISTING:

{CREATE 1}   ORIGINAL FIRST LINE
  {VC FIRST 1} FIRST ADDED LINE AFTER ORIGINAL FIRST
               LINE; {5/10/95; 1400}
  {B FIRST 1}  FIRST ADDED LINE AFTER ORIGINAL FIRST
               LINE; {5/3/95; 1300}

FIG.5

VERSION CONTROL OF DOCUMENTS BY INDEPENDENT LINE CHANGE PACKAGING

FIELD OF INVENTION

This invention relates to a version control system for computer information and, more particularly, to a change oriented version control system, and to a method for replicating changes in plural version repositories.

GLOSSARY

Hereafter the following contractions will be employed in the description below:

ADC=Aide de Camp
BV=Base Version
BVS=Base Version Specification
CV=Corresponding Version
Cx=Change x
BV(Cx)=Base Version for Change x
CV(Cx)=Corresponding Version for x
Cxy=Change x to file y
BV(Cxy)=Base Version for Change x to y
CV(Cxy)=Corresponding Version of Change x to file y
COM=Change Oriented Model
DR=Data Repository
E="End" (SCCS format)
I="Insert" (SCCS format)
ICPS=independent Change Package System
ICPF=Independent Change Package File
IDS=Interleaved Delta Structure
SCCS=Source Code Control System
URN=Universal Resource Name
URL=Universal Source Factor
VOM=Version Oriented Model

BACKGROUND OF THE INVENTION

The cost to develop software is high and the time to develop it is long. Software development rarely starts from scratch. Instead, files from similar software listings are copied and become the foundation of current work. This is shown in FIG. 1 with the code for product A replicated and forming the foundation of product B. While this helps reduce the development cost and time, the practice of leveraging has high maintenance cost when changes are made to both the original and the leveraged code. This is shown in FIG. 1 with changes being made to product A to make product A' which are independent of changes to transform product A to product B.

Most version control systems in the prior art manage change by archiving the revisions of a file and equating a version of code to a list of revision references to files (see FIG. 2). This has been referred to as the version oriented model (VOM). In contrast, Lie, et. al presents the change oriented model (COM). See: Lie et al. "Change Oriented Versioning", Proc. 2nd European Soft. Eng. Conf. (September 89), Ghezzi et al. Eds., vol. 387 of Lecture Notes in Computer Science, Springer-Verlag pp. 191–202. In the COM, a functional change is the primary concept, and a version is specified as a set of functional changes. This is illustrated in FIG. 3, where a change to one or more files is packaged as a singular concept. A new project can leverage code by creating a new version and initializing the version to the list of changes that equate to the leveraged files. Changes done in one version can be added to other versions as needed. A bug fix to the base code can be enabled in all, while specific features remain localized. Tracking changes is done easily by taking the difference between the two versions, which is a list of changes in first, but not the second, and a list of changes in the second, but not the first. The leverage problem becomes manageable using a COM.

Prior art which implements a COM is Aide-de-Camp (ADC), from True Software (formerly Software Maintenance and Development Systems). The ADC system uses a data repository (DR) in which are stored changes (called csets), versions (which are: lists of csets), and relationships between and attributes of versions, changes, files, and other DR entities.

There are limitations to the ADC solution. Csets exist only in the DR in which they were created. That means that all projects wishing to take advantage of the leverage process must use the same. This is difficult when projects reside in different geographical locations and when the original code to be leveraged into a project exists in many repositories. More specifically, it is important to be able to replicate selected changes from any DR to any DR.

ADC includes an export mechanism to get cset information in a DR written to a file, and an import mechanism to integrate the cset into another DR. The export mechanism is an extension of common file difference specifications which reduces all file differences to adding of new lines and deleting of existing lines. A move of a block of text is a delete of the original region of text and an addition of a new block of text. Likewise a replace is a delete and an add.

Each cset can change 0 or more files. The export will be explained for one file, and applying it to the general case is a trivial extension.

The export file specifies the change to a file by listing the block of lines added and the lines deleted. New lines are anchored on a line that existed in a base version (see below for description of base version). By importing all the export specifications in the order of creation, a new DR can replicate the data in the existing DR.

There are three limitations with the ADC implementation. First, developing a cset in each of two DRs, porting each to the other DR, and activating both csets in a version can produce different files. Second, developing two csets in a DR and porting only the second to the other DR might cause the import to fail. And lastly, the system will sometimes crash when importing a file. The first two of these are addressed by the invention, and will be discussed below. The third problem is outside the scope of this invention.

The problem of combining imported and natively created csets, and generating different files is as follows. Cset A in DR A introduces a line at the beginning of file F, and cset B in DR B introduces a line at the beginning of file F. Csets A and B are then exported from their respective DRs and imported to another DR. Csets A and B are then activated in both DRs, generating a version of file F. The version generated in DR A will have the line from cset B appear first, and the version generated in DR B will have the line from cset A appear first. This is because the imported cset introduced a line as the "first line". Had these csets been created in the same database, the cset created second (the newest change) would produce the "first line".

A simple solution would be to order the csets by time, to have the newest cset appear first. This works except that with the resolution of a typical computer time stamp (1 second), time can be equal. To get a reliable ordering, advantage could be taken of the unique naming of the repositories. By alphabetically sorting the names, a reliable method can be developed. But what about 3 csets from one database created in the order S, R, and T, each introducing a line to the beginning of the file F. Exporting these, then importing, would arrange the csets as R, S, and T.

Possibly attaching a create order in the database would resolve how csets from the same database get sequenced. Then all that would need to be addressed is the occurrence of a cset that has a time stamp in the future. A new cset created after importing a cset that had a future time stamp, would want to be sorted after the imported cset, which if active, would mean not being able to reproduce the file as saved. ADC does not solve this problem, and the solution is not straightforward.

The problem of developing two csets and not being able to import only the second is due to how csets are specified. A new line is described as being introduced after an existing line in the DR. If cset A introduces a line at the beginning of file F, and cset B introduces a line after the line introduced by cset A, the specification for cset B will reference cset A. The importing DR has no information about cset A and therefore does not have the information to know where to position the line from cset B in the DR. The operation fails.

Prior art which supports the implementation of a COM exists in the form of the Source Code Control System (SCCS). See: Rochkind, M., "The Source Code Control System, IEEE Transactions of Software Engineering, SE 1, pp 364–370 (1975). While SCCS is primarily a VOM, it has the ability to be the delta management engine for a COM. This is because the change storing technology used has the capability to explicitly enable and disable changes. SCCS does not have delta export or import mechanism. It is a central repository based system.

There are many alternatives for implementing a COM storage system. The intent of the invention is to enhance functionality of existing systems. Rather than develop from scratch a storage scheme, the invention is developed on a derivative of the interleaved delta scheme used by SCCS. The following provides some background on that storage model.

The SCCS interleaved delta structure (IDS) is the last part of an SCCS file. It is a combination of an ordered list of lines of text and embedded control structures. The control structures describe what text a change introduces and deletes. The overall layout is arranged to allow a single pass through the IDS in order to generate a version of text or to integrate a change corresponding to a new version of text.

Each change gets an ID number assigned which is used in the IDS. As the only way to introduce changes in SCCS is through creation, each change integrated is the newest. That means the ID numbers can also be used as an order number, with a larger ID meaning a newer change.

The format of SCCS is to interleave commands and data. All commands begin with an ASCII control-A character (which is written ^A). This assumes that text files being stored will not have lines beginning with ^A, which is a good assumption.

There are three commands in the interleaved delta:

^AI x begin inserting lines for change x

^AD x begin delete region for change x

^AE x end of insert or delete for change x

As insert and delete regions for a change can't overlap, the E command can be used to mark the end of a region for both I and D.

The following example illustrates the format and nature of the IDS. The initial file:

the dog jumped over the moon

The corresponding interleaved delta file:

^AI 1 the dog jumped over the moon

^AE 1

If change 2 adds 'and the cat' after line 1, the new IDS would look like:

^AI 1 the dog

^AI 2 and the cat

^AE 2 jumped over the moon

^AE 1

And if in parallel, someone were to start with only change 1 being active, and replace the first 2 lines of the original file with 'I like to look at':

^AI 1

^AD 3 the dog

^AI 2 and the cat

^AE 2 jumped over

^AE 3

^AI 3

I like to look at

^AE 3 the moon

^AE 1

Note that the delete region includes a line from change 2 that is not in the version. Also note that a replace is stored as a delete region followed by an insert region that starts after the last line deleted. This is the same as ADC (except, as in this case, when the first line of the file is involved in the replace).

Next, another person does another change based on the original file. The change adds 'but not the fish' after the first line:

^AI 1

^AD 3 the dog

^AI 4 but not the fish

^AE 4

^AI 2 and the cat

^AE 2 jumped over

^AE 3

^AI 3

I like to look at

^AE 3 the moon

^AE 1

Activating all changes produces the file:

but not the fish

I like to look at the moon

This is because of the method for activating. A linked list is kept which has the change ID and a ternary state variable that can be one of {yes, no, don't know}. The state variable represents the answer to the question "Should this line be included in the version?". The IDS file is scanned from beginning to end and each I and D command encountered adds a structure to the linked list. An E removes the structure with the same change number (there can only be one element per change in the linked list). The state variable is set as follows:

If the change is active, and the command is I, 'yes'
If the change is not active and the command is I, 'no'
If the change is active, and the command is D, 'no'
If the change is not active, and the command is D, 'don't know'

The linked list is ordered newest change to oldest change.

When scanning the IDS, if it is a command, alter the linked list. If it is data, then start at the head of the linked list and search the list until the answer is not 'don't know'. If the answer is yes, include the line, else do not.

This is how change four got printed, and change two didn't, even though both occur in the delete region defined by change three. A delete region only applies to changes older (smaller number).

There are several views of the SCCS IDS. One is focused on a change as the central element. Each change in the IDS can be viewed as non-overlapping regions of additions and deletes. Another view is focused on all the corresponding I-E pairs. These form a nested structure in the IDS. If a scan is done on the IDS, a stack can be maintained, with each I being a push and the corresponding E being the pop. This nested block structure is an important concept on which the independent change package method is built. Another view of the IDS is of delete regions which are overlaid on the nested blocks of lines.

SCCS and ADC differences: While the SCCS IDS storage scheme has behavior similar to ADC, there are two main areas that it is different. Deletes in SCCS are stored as a region which can delete lines not active at the time the deletion was done. In ADC, deletes target only active lines in the base version of the change. The other difference is that most replacements of a block are stored as a delete of the existing block, followed by the creation of a new block anchored on the last line of the block deleted. In ADC, if the replaced block occurs at the beginning of the file, the new text is anchored on the root line, followed by the delete block. The IDS can store this behavior, but it is not the default behavior of SCCS.

SCCS serves as a good model for introducing the concept of "base" version (BV) and "corresponding" version (CV), to be used below in describing the invention. SCCS primarily implements the VOM. Revisions of files have names like 1.2 and 1.3. SCCS also has the notion of changes 1.2 and 1.3. Depending on context, SCCS interprets the revision number to either mean the state of a file after a change or the change itself. This distinction is not named in SCCS. Hereafter, the state of the file will be referred to as the corresponding version of the change. A corresponding version is the version of the objects at the time a change is completed. Likewise, a base version is the version of objects upon which the change was developed. There is a simple relationship between the two. If BV(Cx) is read as the base version of change x, and CV(Cx) is the corresponding version to change x, then:

$$CV(Cx)=BV(Cx)+Cx$$

To store the CV(Cx), SCCS stores information to compute the BV(Cx). It comprises the parent version, plus changes to include, minus changes to exclude. The information stored with a revision is compact, since it is based on another revision. However, SCCS has limitations for independent change replication. The desire is if all the changes that make up the corresponding version for a change are present in a, then the corresponding version should be computable. Using the SCCS scheme, information needed to reconstruct the corresponding version may be stored with changes not in the corresponding version.

In the prior art, there is a tool called ClearCase from Atria. It also stores changes using interleaved delta format, and has a product called Multi-Site. However, it is different than the invention. While ClearCase uses interleaved delta, they cannot do the COM. A change done on one branch is replicated, not activated, when merged into another branch. The multi-site model simply replicates a mastered branch into the repositories of other sites. It cannot, for example, export to another DR only the latest change. It must replicate all changes on the branch. It does not allow developers attached to different repositories to work on a replicated branch. Only one identified as the master can change the file on the replicated branch.

SUMMARY OF THE INVENTION

The "Independent Change Packaging System" (ICPS) allows any change stored in any ICPS data repository to be replicated in any other ICPS data repositories. Any set or subset of changes that reside in a DR may be activated to create a version of files. If the same set of changes are activated in multiple repositories, independent of how the changes came to be in those repositories, the computed versions of the source files are identical. If all the changes are present relating to the corresponding version of the entire system, then the corresponding version of the system can be generated. If not all the changes are there, but the changes needed to generate at least one of the components affected by the change, then the corresponding versions of the component can be generated.

ICPS makes use of change order identification, base version recovery, and interleaved delta enhancements to achieve independent change packaging.

BRIEF DESCRIPTION OF DRAWINGS

FIG. 5 illustrates how the invention employs temporally related change order values that are associated with revision lines to assure consistency in remotely located computer information.

DETAILED DESCRIPTION OF THE INVENTION

Figure 1:
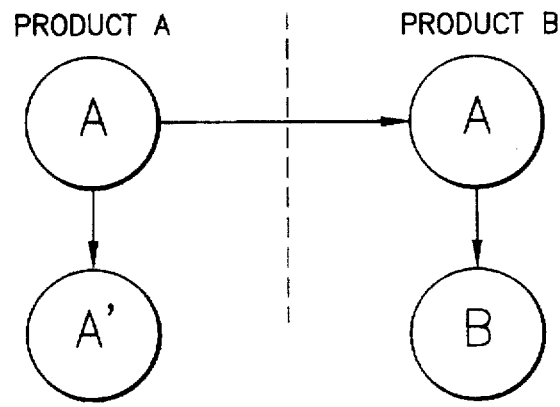
FIG. 1 shows code leverage. Code from product A is copied as the foundation of product B. The code base for product A is then modified to become A'. The code in product B is modified to become B. Tracking and porting changes is difficult.
Figure 2:
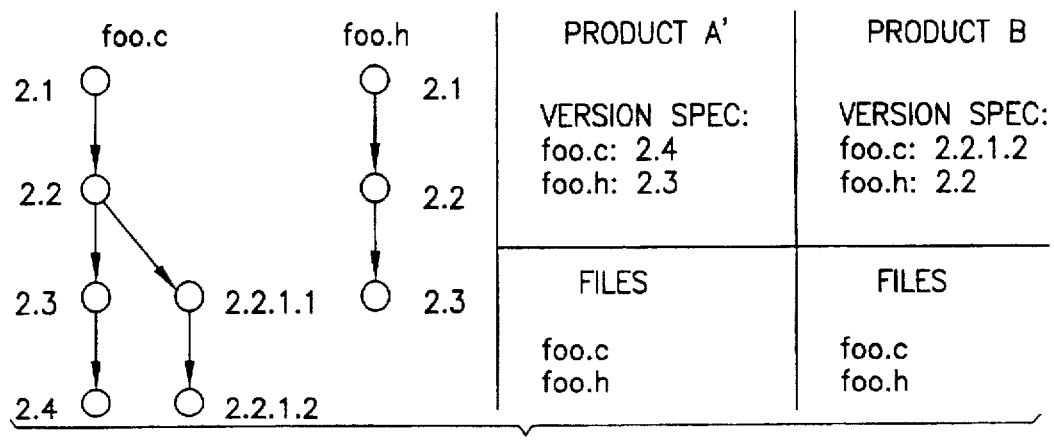
FIG. 2 shows a typical file based management system (RCS and all its derivatives). Each file has a revision tree. A product specification is a list of file revisions. That version spec can be transformed into a group of files.
Figure 3:
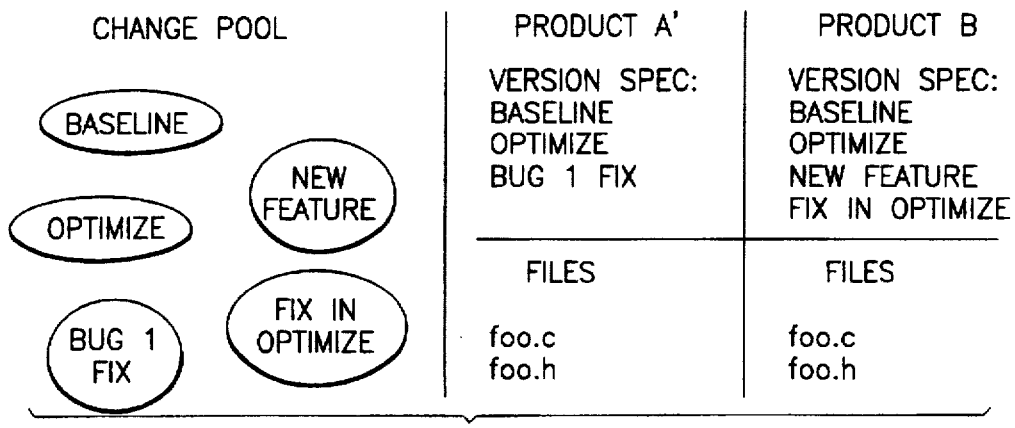
FIG. 3 shows a change based system like Aide-de-Camp. The contains a collection of changes. A version specification is an unordered list of changes that corresponds to the version. The version specification can then be transformed into the group of files.

The ICPS manages files which can be modeled as an ordered sequence of tokens. For files that are ordinary text files, a token is a new line terminated string of text. For files that aren't text files, but are an ordered set of tokens, then the token string can be mapped to a text string. For files that are an unordered set of tokens, like directories, an ordering can be done, to create a repeatable sequence. The ICPS is described for an ordered set of new line terminated text tokens to cover the general case.

Change Name

Each change requires a unique name. Prior art embodied in the World Wide Web (WWW) in the form of URL naming technology is used to manage the name space. See: Browne et al., "Location-Independent Naming for Virtual Distributed Software Repositories", Proc. of the Symposium on Software Reusability (April 95) ACM press. Each has a unique URL (Universal Source Factor for accessing information) or a URN (Universal Resource Name). Change names are then assured to be unique to a DR. Since each has a unique URL, the complete name for a change will be unique. A URL example is:

$$\text{http://\{server\_name\}/\{repository\_name\}/\{change\_name\}}$$

Change ID Number

Each change that gets integrated (created or imported) into a DR will have an ID number used internally in the DR. It represents the order the change was introduced into the DR, but unlike SCCS, does not represent the order of creation.

Change Order

Changes developed in separate DRs should behave as if they had been created in the same DR. This is difficult to achieve because the value of current time can vary in each processor. It is possible to have a change in the base version that was created in the future. A simple solution is to use a time based equation to determine when a change is created. The value of time is adjusted to insure that it is the newest time in the DR.

$$\text{order=max(time, max order in DR+1)}$$

Changes created in different DRs may have the same order number. But, all changes are required to have a unique name. ICPS resolves the ordering problem by sorting the names alphabetically. Naming is never used to resolve same order from changes made in the same DR. All changes from a given DR will have a unique order number. This meets the minimum requirement that each change be newer than all changes that make up the base version.

A more robust alternative is to have an order vector. This is useful if the rate of new changes approaches one per second or it is very important to keep the sort order consistent with actual time. The vector has two elements that form a major/minor pair. The time is the major component and sequence at this time is the minor number.

$$\text{order\{ordtime, sequence\}} = \\ \max(\ \{time,0\}, \\ \max(\text{order in}) \\ + \{0,1\}\ )$$

The max function for the vector is defined by:

$$\max(\{time1, seq1\},\{time2, seq2\}) = \\ (time1 > time2 \ || \\ (time1 == time2 \ \&\&\ seq1 > seq2)) \\ ? \ \{time1, seq1\} \\ : \ \{time2, seq2\}$$

As with the simple case, for changes with the same order vector, the order will be resolved by alphabetically sorting the name.

Base Version and Corresponding Version

A change is made by starting with a version of the system, modifying a set of files, and integrating the modifications into the resulting in a new version. The starting version is called the Base Version (BV) for a change. The ending version is the Corresponding Version (CV) for a change.

Cx=Change x
BV(Cx)=Base Version for Change x
CV(Cx)=Corresponding Version for x
The equation relating them is:

$$CV(Cx)=BV(Cx)+Cx$$

Each file, modified by the change, also has a BV and CV. Since not every change modifies every file, the BV for a file will be a subset of the BV of the system. The subset could be different for every file modified by the change.

Cxy=Change x to file y
BV(Cxy)=Base Version for Change x to y
CV(Cxy)=Corresponding Version for Change x to file y
The equation is:

$$CV(Cxy)=BV(Cxy)+Cxy$$

If a file was modified by every change, then for that file:

$$BV(Cxy)=BV(Cx).$$

For many changes, the BV for a change will be the CV for the previous change. Storing the entire version list for each change would involve mostly replication. A compact way of specifying BV causes each change to have a BV specification (BVS). An entry in a BVS refers to other BVSs. Each file has a BVS table. There is also a BVS table for the system as well. Entries in the BVS are sorted according to Change Order, with the newest entries appearing first.

A BVS is made up of 2 lists: activate and ignore. To transform a version list to a BVS:

```
for each change in the BVS table
    if the change is in the version
        if not marked as activated
            add to activate list for BVS
    for all activate entries
        if not marked to ignore
            if in entry is version
                mark as activated
            else
                add to ignore list
    for all ignore entries
        mark to ignore
```

If a BVS has only one item in the activate list, and no items in the ignore list, then the version is a CV for the item activated. Time stamps of files specified by a version list are calculated by determining if the file is a CV for some change using the above criteria. If it is, it gets the time stamp of that change. If not, it gets the current time.

The BVS is transformed into the BV by:

```
for activate items in the BVS
    if not marked to ignore
        add 'to be activated'
for ignored items in the BVS
    mark to ignore
for each change in the BVS table
    if 'to be activated'
        add to version
        remove from 'to be activated'
        for activate items
            if not marked to ignore
                add to 'to be activated'
        for ignore items
            mark to ignore
if 'to be activated' is not empty
    changes needed to compute the BV
    are not present in the
```

The method of transforming BVS to BV is designed such that only the changes in the BV are required to be present in the DR. What this may mean is that for a change, the BV for some of the modified files may be computable, while some may be incomplete.

Line Naming

Each line has a unique name. Making use of the ADC export file with slight alteration, each line is named for the change and the line number within the change. Each change can introduce zero or more blocks, each of one or more lines. Line numbers are sequential, starting at one and continuing across block boundaries. In ADC, line numbers start at zero.

As each change name has a corresponding ID, the name can be specified as:

ID line_number

Export a Change

Similar to the export file in ADC, it is possible to package the change information from an SCCS IDS file. For the data added by the change, there can be an entry in the export file that looks like:

^AI {anchor line name} data

For delete regions, the specification has an entry for the beginning and the end:

^AD {start line name}

^AE {end line name}

The specification for each file altered by the change is terminated by:

^AZ

Given the IDS from the Background of the Invention section:

^AI 1

^AD 3 the dog

^AI 4 but not the fish

^AE 4

^AI 2 and the cat

^AE 2 jumped over

^AE 3

^AI 3

I like to look at

^AE 3 the moon

^AE 1

The export description for change 2 is

^AI 1 1 and the cat

^AZ

The specification lists change ID 1 line 1 as the anchor line, even though the previous line in the DR is from change 4 ('but not the fish'). This is because a stack is kept, pushing on a change for every I command and popping the stack for every corresponding E command. The anchor line comes from the change specified by the top of stack.

The export specification for change 3 looks like:

^AD 1 1

^AE 1 2

^AI 1 2

I like to look at

^AZ

Changes referred to in the export specifications are called 'reference changes'. The specification contains no information about them other than to refer to them. As the ID numbers are specific, the export specification also includes a section which maps change name to specification ID.

Importing a Change

The export specification is integrated into a different DR through the import process. An assumption is that all reference changes already exist in the importing DR. The export specification is scanned. For each I command, the IDS file is scanned for the referenced line. If the line after the reference line is an I command, and the corresponding change is newer than the imported change, the lines in the IDS up to and including the corresponding E command are skipped. If the next line is an E command that is from a change newer than the importing change, then the E line is skipped. These 2 rules are repeated until no more lines can be skipped. The new data is then inserted.

For deletes, lines in the IDS are skipped until the line preceding the anchor line. Then all I-E pairs are skipped, and all IDs are skipped that are older. If the E corresponding the change for the anchor appears, then skip to the next block for this change, and continue the search. When all lines according to the rules have been skipped, insert the begin delete block command. Then skip to the anchor line for the delete region end. Then skip all I-E pairs that are younger, and end of other delete regions that are younger. When all lines according to the skip rules are skipped, mark end of delete region.

In normal SCCS, the ID number can also be used for change order. With the addition of import and export, that is no longer the case. While it is an option to renumber all IDS files to keep this ordering valid, it is simpler to add in another table which translates ID number to change order number.

Incomplete Specification

The desire is to remove the assumption in the previous Import section which requires all referenced changes to already be in the importing DR. This allows changes to be replicated independently of each other, and even if all changes are to be replicated, the order of replication is no longer important.

In an incomplete IDS, some of the data will not be there. In its place, will be markers, or place holders so that the block structure can be maintained, and export files generated and integrated.

All that is required is a 'marker' command:

^AM {line_number}

Export

The process for exporting to a DR that might not have all the referenced changes is similar to the export process already described. The invention make use of a compact technique for specifying information to chain back to the root line. A stack is kept during the scanning of the IDS. For every I command, the anchor line for that block is pushed on the stack. For every corresponding E, the stack is popped. When a command entry is going to be output to the export specification, the stack is written out first, and cleared. Popping an empty stack is benign.

The root line is referred to as change 0, line 0. Since every export file will have as its first line

^AI 0 0, it will be assumed and not included in the export specification.

For change 3, the export file is:

^AA 1 1
^AE 1 2
^AI 1 2
I like to look at
^AZ

In this case, this is the same file. This is the case because all changes made reference to only the initial file. The difference is that this file does not assume that the initial file is not in the DR.

The reference changes may not be in the importing DR. The export specification must also include change order for all referenced changes.

Importing

Integrating an exported change specification into an IDS that may or may not have the referenced changes is a process which yields a structure identical to the exporting

EXAMPLE

Figures 4, 6:
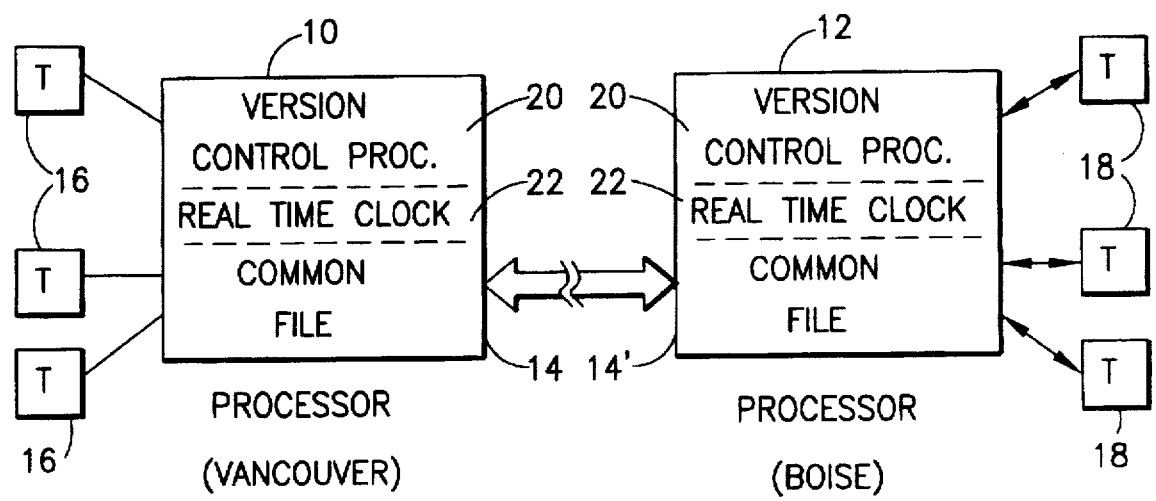
FIG. 4 is a high level block diagram illustrating remotely located DRs containing a common code listing which is being updated by developers at the remote locations.
FIG. 6 illustrates an absolute address which is employed by the invention to accompany a change and enables a receiving site to identify all code lines associated with the change.

In FIG. 4, a pair of processors 10 and 12 (i.e., DRs) are located at separate locations (e.g., Vancouver and Boise, respectively), and include common files 14 and 14'. Each processor 10 and 12 is accessed by a plurality of co-located terminals 16 and 18, respectively, which enable users to update common files 14 and 14' on a continuing basis. Periodically, changes are transferred between processors 10 and 12 so that common files 14 and 14' are maintained as identical versions in both processors. To accomplish the transfer, each processor includes a version control procedure 20 which enables insertion of the changes into its respective common file 14, 14'. Further, each of processors 10 and 12 includes a real time clock 22 which enables each code change in a DR to have appended a change order number which is based on the time the code change is created in the respective, originating processor.

As described above, a change order value is derived at change creation and is a time value that is the larger of: (i) the current time at change creation or (ii) the maximum change order value (plus 1) present in the DR. As will be understood from the description below, the (ii) value can be greater than the current time value when there is a difference in the real time clocks in the cooperating processors, or if multiple changes are processed concurrently within a same time increment (e.g., one second). In such a case, the changes are assigned ascending value change order numbers.

Version control procedure 20 employs change order numbers to arrange received changes in temporal order. More specifically, version control procedure 20 examines the change order number of each received change related to a base code line. All such changes are arranged in accordance with the following protocol: any new change line is positioned (with respect to the associated base code line) after a change line that has a more recent change order number. Thus, a change line with a most recent change order number is listed immediately after the base code line, followed by succeeding change code lines having less recent change order numbers. Through use of this protocol, version control procedure 20 assures, in both processors 10 and 12, that the code listings therein will be identical—after transfer of change packages therebetween.

Referring to FIG. 5, an example will be described which illustrates the temporal ordering of change lines in processors 10 an 12. The original code listing present in common files 14 and 14' is as shown at A. It is next assumed that a user in Boise (B) creates a first change line denoted {Boise First 1} for the base code line denoted {Create 1}. That change line includes the new code "First added line after original first line" with an appended change order number which represents the date and time as follows: {5/3/95, 13:00}. The 5/3/95 is the date and "13:00" is the time of day on which the change line was implemented on the Boise processor.

Similarly, in Vancouver (VC) a code change line is also added after the base code line {Create 1}; is denominated {VC First 1}; and includes the change code line "First added line after original first line" having a change order number of {5/7/95, 14:00}.

Thereafter, on May 10th, it is assumed that ICP files from Vancouver and Boise are exchanged and are installed on respective computers 10 and 12. As indicated above, version control procedure 20 in each of processors 10 and 12 uses a change order number ordering procedure for arranging the change code lines after the associated base code lines. In this instance, the base code line is {Create 1}, i.e., "Original first line". Version control procedure 20 in processor 10 (in Vancouver) places {VC First 1} after base code line {Create 1} as {VC First 1} has a more recent change order number than {B First 1}. Similarly, in Boise the received code line {VC First 1} is arranged identically as in Vancouver, as the {VC First 1} code line includes the most recent change order number. In such manner, the code listings in processors 10 and 12 in Vancouver and Boise, respectively, are assured to be identical after the exchange of ICPF's.

Under rare circumstances, a change order number for two change code lines may be identical. In such a case, revision control procedure 20 lists the identical change order number change code lines alphabetically by their unique names. In such manner, code listing consistency is retained.

When code changes are transferred between processors, there is no absolute assurance that all intermediate code changes that are to be altered by a latest code change, are present on the processor receiving the latest code change. Under such a circumstance, when a latest change is exported as an ICPF and importing is attempted, if such an intermediate code change is absent, the importing action will fail.

To enable version control procedure 20 to detect such an absence of such an intermediate code change, an absolute address protocol is implemented. In specific, each command in an ICP file is accompanied by an absolute address which includes the names of all code lines which the ICP file is to alter. Thus, the absolute address appended to an ICP file identifies all change code lines that are necessary for execution of the latest code change.

Version control procedure 20 utilizes a received absolute address to determine if all required change code lines are present in its local DR, and if not, remedial action is taken. In summary, each change code line includes an absolute address of all preceding in time change code lines which must be present to enable a complete change action to be implemented. If one of the listed absolute address entries is absent, version control procedure 20 records the address of the missing change code and employs the recorded address as a "placeholder" pending receipt of the missing change data.

To enable a user to recreate a base version existing before a most recent change, each change further includes a chaining reference to an immediately previous change which was active at the time of the later change and had the highest change order number. Such a chaining reference allows the user to sequence back through all changes to the base version.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

I claim:

1. A version control method for assuring consistency of computer information in a common file resident in a first data repository (DR) and a second DR, each DR including means for transferring changes in said computer information to another said DR and further including means for implementing said version control method, said method comprising the steps of:

producing an independent change package data file (ICPF) in said first DR which includes a change relating to at least one line of said computer information and further includes a change order value therefor;

transferring said ICPF to said second DR;

processing said ICPF to extract said change and data pertaining to said change; and arranging said change in said second DR in a temporal manner with respect to all other changes evidencing alterations to said at least one line of said computer information, said arranging taking into account the change order value which accompanied the change in said ICPF.

2. The version control method as recited in claim 1, wherein said change order value includes a current time at creation of said change or includes a maximum change order value, plus one, that is present in said DR at time of said creation.

3. The version control method as recited in claim 2, comprising the added step of:

arranging said change in said first DR with respect to each other change to said at least one line of said computer information, said arranging taking into account a change order value included with each ICPF that further included said each other change, whereby consistency is maintained between computer information related to said common file in said first DR and second DR.

4. The version control method as recited in claim 2, comprising the added steps of:

arranging said change in said second DR with respect to each other change to said at least one line of said computer information, said arranging taking into account a change order value included with each ICPF that further included said each other change, whereby consistency is maintained between computer information related to said common file in said first DR and second DR.

5. The version control method as recited in claim 2, wherein said temporal manner comprises a list of all previous-in-time changes to be altered by a latest temporal change, said list arranged so that a change that is latest in time is listed first, followed by each change that is increasingly older-in-time.

6. The version control method as recited in claim 2, wherein, if two changes are created with an identical change order value, said two changes are arranged alphabetically in accordance with a unique address name appended to each said change.

7. The version control method as recited in claim 2, wherein each current change includes a reference to a previous change, in said common file, which previous change was active and evidenced a highest change order value when said current change was created, said method enabling, if in said DR all changes making up a base version of said common file are present, re-creation of said base version of said common file by the further step of:

determining changes to said base version by accessing each said reference through successive examinations of each said previous change.

8. A version control method for implementing consistency of computer information for a common file resident in a first data repository (DR) and a second DR, each DR including means for transferring changes in said computer information to another said DR and further including means for implementing said version control method, said method comprising the steps of:

storing plural independent change package data files (ICPF's) in said first DR, each ICPF including at least one change to a common base code line in said computer information, each said change having a unique identifier and manifesting an alteration (i) from a change code line created prior in time and relating to said common base code line, or (ii) from said common base code line if no change code line was created prior in time and relating to said common base code line; and transferring one said change to said second DR, said one said change having an absolute address comprising a listing of each unique identifier of each change code line relating to said common base code line required by said second DR to enable intregation of said change into said computer information.

9. The version control method as recited in claim 8, wherein said second repository utilizes said absolute address to determine how said change will integrated into said computer information.

* * * * *